Jan. 29, 1946.  D. R. SHOULTS  2,393,713
AIRCRAFT SUPERCHARGER
Filed May 20, 1942   2 Sheets-Sheet 1
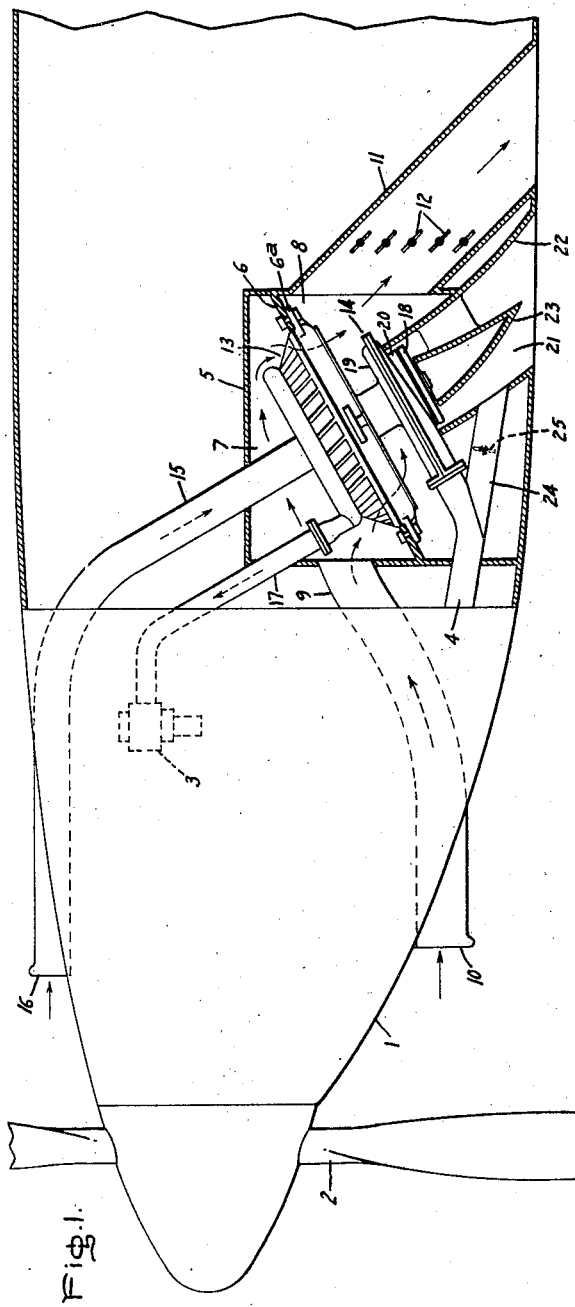
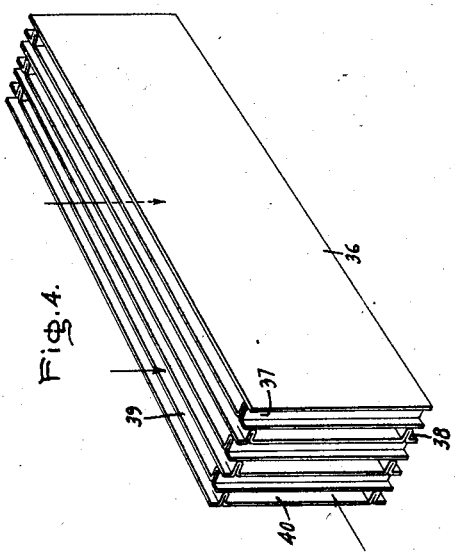
Inventor:
David R. Shoults,
by Harry E. Dunham
His Attorney.

Jan. 29, 1946.  D. R. SHOULTS  2,393,713
AIRCRAFT SUPERCHARGER
Filed May 20, 1942  2 Sheets-Sheet 2

Inventor:
David R. Shoults,
by Harry E. Dunham
His Attorney.

Patented Jan. 29, 1946

2,393,713

UNITED STATES PATENT OFFICE 2,393,713

AIRCRAFT SUPERCHARGER

David R. Shoults, Schenectady, N. Y., assignor to General Electric Company, a corporation of New York Application May 20, 1942, Serial No. 443,748

4 Claims. (Cl. 230—209)

The present invention relates to aircraft superchargers and has for its object to provide an improved construction of supercharger and an improved arrangement of the same on an aircraft.

For a consideration of what I believe to be novel and my invention attention is directed to the following specification and the claims appended thereto.

Figure 2:
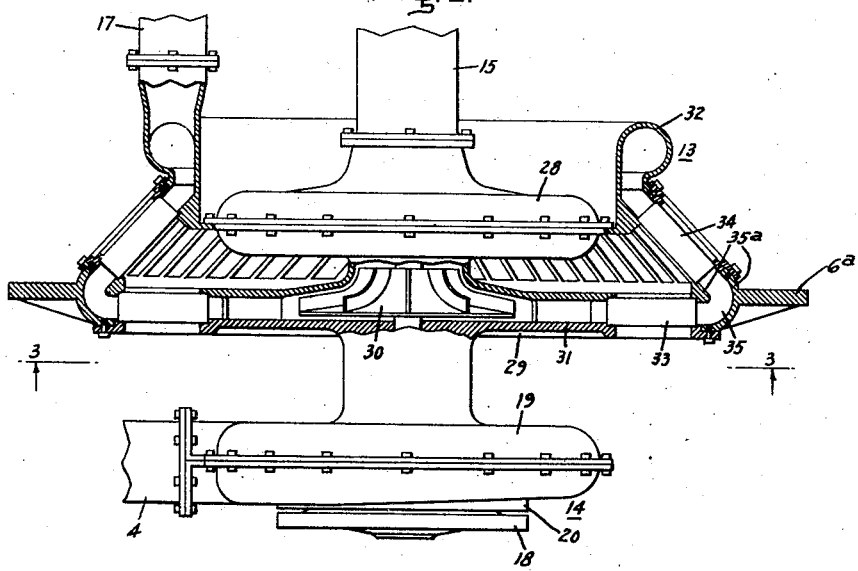
Figure 3:
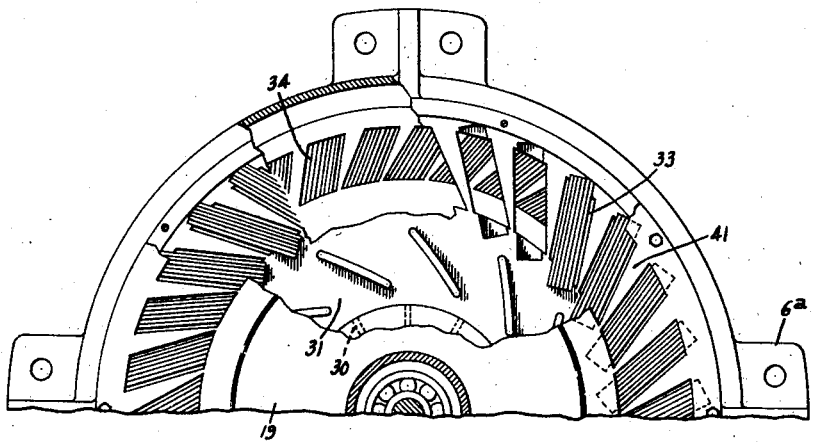

In the drawings, Fig. 1 is a diagrammatic view of a part of an aircraft having my improved construction mounted thereon; Fig. 2 is a side view, partly in section of the supercharger; Fig. 3 is a sectional view, partly broken away, taken on line 3—3 of Fig. 2, looking in the direction of the arrow; and Fig. 4 is a detail perspective view of an intercooler or heat exchanger section.

Referring to the drawings, 1 indicates the body of an aircraft having a propeller 2 driven by an internal combustion engine (not shown), except for the carburetor which is indicated at 3 and the exhaust conduit which is indicated at 4. In the body of the aircraft are walls 5 which form a compartment in which the supercharger is mounted. It is supported on a ledge 6 carried by walls 5, and this ledge and the supercharger serve to divide the compartment into an air admission chamber 7 and an air discharge chamber 8. The supercharger casing is provided with spaced ears 6a which are bolted to ledge 6. Connected to air admission chamber 7 is an air inlet conduit 9 which terminates in a ram 10 facing into the slip stream, and connected with air discharge 8 is a discharge conduit 11 which communicates with the atmosphere and faces in a generally rearward direction. In conduit 11 is a set of adjustable louvers 12 for controlling flow of air through the conduit.

The supercharger comprises a compressor 13 and a gas turbine 14. In the present instance air is supplied to the compressor through a conduit 15 which terminates in a ram 16 facing into the slip stream. However, conduit 15 may be omitted in which case air is supplied to the compressor from chamber 7. It is discharged from the compressor through a discharge conduit 17 which connects with carburetor 3. In the present instance a two stage supercharger is illustrated. It is to be understood, however, that my invention is not limited to the use of two stages. The gas turbine comprises a turbine wheel 18 mounted on the same shaft with the compressor impellers and a nozzle box 19 provided with a ring of nozzles 20 through which gases are discharged against the buckets of the wheel. The nozzle box is connected to the exhaust manifold of the engine by conduit 4. Exhaust gases from the turbine wheel are discharged through an annular conduit 21 to atmosphere, the conduit being formed by walls 22 and 23 and being directed generally rearwardly. Connected with conduit 4 is a waste conduit 24 which communicates with atmosphere through conduit 21 and in which is located the usual waste gate valve 25 for controlling the flow of exhaust gases to the nozzle box. When the valve 25 is open, the exhaust gases flow directly to atmosphere, little if any gases being discharged against the turbine wheel. This represents no load condition. As valve 25 is gradually closed, pressure is built up in the nozzle box to effect flow of gases to the turbine wheel, maximum condition being reached when the valve is fully closed.

Referring now to Figs. 2 and 3 wherein the supercharger is shown more in detail, 28 indicates the first stage of the two stage compressor and 29 the second stage. The first stage comprises the usual impeller mounted on the shaft of the machine which receives air at its central portion through conduit 15 or from chamber 7, as the case may be, and discharges it through a diffuser to an annular discharge scroll from whence the air flows to the second stage impeller 30. The detail structure of the first stage is not shown as this forms no part of my present invention. It may be any suitable construction. Surrounding impeller 30 is a diffuser 31 comprising curved vanes which define diffuser passages for the flow of air discharged from the impeller and for converting velocity into pressure, and beyond it as regards the flow of air is a two pass or two unit counterflow intercooler or heat exchanger through which the air flows on its way to discharge scroll 32 with which discharge conduit 17 connects. Discharge scroll 32 is located axially forward of the second stage of the compressor and in the present instance is shown as being formed integral with the casing for the first stage of the compressor. The first pass or unit of the cooler as regards the direction of flow of air from the diffuser is indicated at 33 and the second pass or unit at 34. They are connected by an annular passage 35 formed by suitable walls 35a. Each pass or unit comprises a plurality of rectangular cooler sections as shown in Fig. 4 assembled to form an annulus. The sections may be of any suitable construction, the essential thing being that their walls define passages for the flow of the air to be cooled, and interspersed passages for the flow of cooling air. In the present instance a section is shown as comprising a plurality of plates 36 formed from thin material held in spaced relation to each other by spacers 37 and 38 to define passages 40 for the flow of air to be cooled and passages 39 interspersed therewith for the flow of cooling air. The sections are assembled with angular or wedge shaped spacers 41 between them to form an annulus of the desired diameter and united by suitable means such as by brazing, soldering or the like. The two structures are assembled between the ends of the side walls of the diffuser 31 and the scroll 32 as shown in Fig. 2, the two structures being in V relation to each other. The admission side of cooler unit 34 faces into cooling air admission chamber 7 and the discharge side of cooler section 33 faces into cooling air discharge chamber 8. Thus the cooling air flows through cooler 34 and then through cooler 33. The air to be cooled flows from diffuser 31 through cooler 33 then through cooler 34 to discharge scroll 32. With this arrangement it will be seen that the cooling air is used first in the second pass or unit of the cooler as regards the flow of air to be cooled and then in the first pass or unit. Thus the cooling air of lowest temperature is used for cooling the air which has already passed through the first unit and been cooled therein, an arrangement which gives the most efficient results.

By providing a cooler comprising two passes or units which units are annular and are arranged in V or angular relation to each other I provide a compact construction which is relatively light in weight and of minimum diameter, advantages of particular importance in the case of aircraft. In this connection it will be noted that the one cooler unit 33 directly surrounds the second stage of the compressor, that the other cooling unit is located axially thereof in the direction of the first stage and extends in a generally axial direction, and that the discharge scroll for the second stage is located axially beyond the cooler unit 34 and, in the arrangement shown in the drawings, is axially beyond the first stage of the compressor.

It is this which enables me to obtain an especially compact construction with both axial and radial dimensions reduced to a minimum.

In accordance with the provisions of the patent statutes, I have described the principle of operation of my invention, together with the apparatus which I now consider to represent the best embodiment thereof, but I desire to have it understood that the apparatus shown is only illustrative and that the invention may be carried out by other means.

What I claim as new and desire to secure by Letters Patent of the United States is:

1. A compressor comprising an impeller, a diffuser, a discharge scroll, and a heat exchanger arranged between the diffuser and discharge scroll comprising two annular units arranged angularly with respect to each other and serially as regards the flow of medium to be cooled.

2. A compressor comprising an impeller, a diffuser surrounding the impeller, a first cooler unit surrounding the diffuser, a discharge scroll spaced axially from said cooler unit, a second cooler unit arranged between the first cooler unit and the discharge scroll, and means for effecting flow of cooling medium through said cooler units in series.

3. A compressor comprising an impeller, a diffuser surrounding the impeller, a first cooler unit surrounding the diffuser, a discharge scroll spaced axially from said cooler unit, a second cooler unit arranged between the first cooler unit and the discharge scroll, said two cooler units being at an acute angle relatively to each other, and means for effecting flow of cooling medium through said cooler units in series.

4. A compressor comprising a first stage and a second stage arranged in axial relation to each other, a discharge scroll for the second stage spaced axially therefrom in the direction of the first stage, and a cooler comprising two annular units arranged in series, one of which surrounds the second stage of the compressor and the other of which extends generally axially in the direction of the first stage and connects with said second stage discharge scroll.

DAVID R. SHOULTS.